(12) United States Patent
Brand et al.

(10) Patent No.: US 9,395,026 B2
(45) Date of Patent: Jul. 19, 2016

(54) COUPLING DEVICE WITH RESIDUAL PRESSURE RELIEF SYSTEM

(71) Applicants: Bernard Brand, Vetraz-Monthoux (FR); Sébastien Lafond, Habère Lullin (FR)

(72) Inventors: Bernard Brand, Vetraz-Monthoux (FR); Sébastien Lafond, Habère Lullin (FR)

(73) Assignee: EATON SAS, Annemasse (FR)

( * ) Notice: Subject to any disclaimer, the term of this patent is extended or adjusted under 35 U.S.C. 154(b) by 0 days.

(21) Appl. No.: 14/377,187

(22) PCT Filed: Jan. 29, 2013

(86) PCT No.: PCT/EP2013/051614
§ 371 (c)(1),
(2) Date: Aug. 7, 2014

(87) PCT Pub. No.: WO2013/117453
PCT Pub. Date: Aug. 15, 2013

(65) Prior Publication Data
US 2015/0000770 A1    Jan. 1, 2015

(30) Foreign Application Priority Data
Feb. 8, 2012   (EP) .................................. 12290046

(51) Int. Cl.
*F16L 37/34*   (2006.01)
*F16L 55/00*   (2006.01)
*F16L 37/35*   (2006.01)
*F16K 15/02*   (2006.01)

(52) U.S. Cl.
CPC ............... *F16L 55/00* (2013.01); *F16K 15/025* (2013.01); *F16L 37/34* (2013.01); *F16L 37/35* (2013.01); *Y10T 137/7854* (2015.04)

(58) Field of Classification Search
CPC ........... F16L 37/35; F16L 37/34; F16L 55/00; F16K 15/025; Y10T 137/7854
USPC .................... 137/614, 614.03, 614.04, 614.05
See application file for complete search history.

(56) References Cited

U.S. PATENT DOCUMENTS 4,546,956 A * 10/1985 Moberg .................. F16L 37/46
                                                       251/149
4,896,697 A    1/1990 Stromdahl
(Continued)

FOREIGN PATENT DOCUMENTS

DE           4101001 A1    7/1991
DE     102007008143 A1    9/2007
(Continued)

*Primary Examiner* — Marina Tietjen
*Assistant Examiner* — Umashankar Venkatesan
(74) *Attorney, Agent, or Firm* — Leydig, Voit & Mayer, Ltd.

(57) ABSTRACT

A coupling device includes a first half and a second half adapted to be connected to each other. The first half has a body housing a front chamber and a rear chamber separated by a first element and a second element slidably inserted in a bore provided in the first element. The bore forms an inner cavity in fluid communication with the front chamber and communicating with the rear chamber via a first through-hole provided in the first element. The cavity is sealed from the rear chamber and in that upon connection of the coupling device the second element is longitudinally moved on that a second through-hole provided in said second element comes in fluid communication with the first through-hole thereby providing a fluid communication between the two chambers via the cavity.

14 Claims, 4 Drawing Sheets

(56) References Cited

U.S. PATENT DOCUMENTS

| | | | |
|---|---|---|---|
| 5,159,955 A | 11/1992 | Ekman | |
| 5,884,897 A | 3/1999 | Arosio | |
| 5,996,624 A | 12/1999 | Ekman | |
| 6,024,124 A * | 2/2000 | Braun | F16L 37/0841 137/614.03 |
| 6,026,857 A | 2/2000 | Stucchi | |
| 6,145,539 A * | 11/2000 | Wilcox | F16L 37/23 137/614.03 |
| 6,170,522 B1 * | 1/2001 | Tanida | F16L 39/00 137/614.02 |
| 6,382,251 B1 * | 5/2002 | Hopson | F16L 37/23 137/614 |
| 6,866,064 B2 * | 3/2005 | Nanni, Jr. | F16L 37/088 137/15.09 |
| 2002/0174904 A1 | 11/2002 | Arosio | |

FOREIGN PATENT DOCUMENTS

| | | |
|---|---|---|
| EP | 0265569 A1 | 5/1988 |
| EP | 0814293 B1 | 12/1997 |
| EP | 0862010 A1 | 9/1998 |
| EP | 0932791 B1 | 8/1999 |
| EP | 1260752 B1 | 11/2002 |
| EP | 1269064 A1 | 1/2003 |
| WO | WO 0061984 A1 | 10/2000 |

\* cited by examiner

COUPLING DEVICE WITH RESIDUAL PRESSURE RELIEF SYSTEM

CROSS-REFERENCE TO RELATED APPLICATIONS

This application is a U.S. National Stage application under 35 U.S.C. §371 of International Application No. PCT/EP2013/051614, filed on Jan. 29, 2013, and claims benefit to European Patent Application No. 12 290 046.7, filed on Feb. 8, 2012. The International Application was published in English on Aug. 15, 2013, as WO 2013/117453 A1 under PCT Article 21(2).

FIELD

The present invention is directed to a coupling device, and more particularly, to a coupling device comprising a pressure relief system assisting connection of the coupling device.

BACKGROUND

In recent years, various coupling devices have been provided for coupling two fluid storage and/or fluid transport means. Conventional coupling devices are made of two couplings, also called halves, i.e. one plug and one socket. These couplings seal the end of the storage and/transport means, e.g. a hose, to which they are attached in order to prevent leakage. In absence of leakage, the fluid contained in the storage and/or transport means applies a pressure on the couplings. This pressure, also called residual pressure, renders connection of the two couplings very difficult when connection consists in applying a force against said pressure, i.e. pushing a valve in the rear direction of the coupling.

In order to solve these problems, coupling devices have been provided with butterfly valves which can be opened without applying a force against the residual pressure. However these valves require a complicated mechanism involving both rotational and straight movements. Piston-like valve are preferred from that point of view as they have a relatively simple mechanism, i.e. one or more valves biased against the coupling body by one or more springs in order to prevent leakage. However, as mentioned above, opening of these types of valve requires application of a considerable force against the spring and against the residual pressure.

Published European patent application No. 0 265 569 describes a coupling device comprising a pressure relief system in the socket. Said socket comprises a socket body housing a first valve 14 comprising a cylindrical bore and a second valve 22 located and adapted to slide inside said cylindrical bore. The socket comprises two chambers, a first chamber, called space 31, comprising the residual pressure of the fluid and a second unsealed chamber 28 at the front end of the socket. Upon connection of the plug and the socket, the plug first moves the second valve 22 such that a fluid connection is provided between the two chambers and that the residual pressure is evacuated from the first chamber to the second chamber. This device however presents several drawbacks, i.e., the second valve is subjected to the residual pressure because of a hole 29 provided in the first valve. Therefore, a large amount of effort is needed to move said first valve before pressure evacuation. Also, the second chamber is not sealed and can therefore be subject to any type of contamination. Finally, as the front end and the second chamber are not sealed, the socket can therefore be coupled only with specific plugs which provide sealing at the moment of decompression, i.e. the moment where fluid communication is realized between the two chambers, otherwise leakage may occur.

U.S. Pat. No. 5,996,624 describes a quick-coupling device comprising a pressure relief system made of three different valves. A first valve 31, a second valve 40 and a third valve 50 are positioned along the longitudinal direction of the plug body such that upon connection, a piston of the socket pushes the first valve which in turn pushes the second valve that finally pushes the third valve thus providing fluid connection between a rear chamber and a front chamber of the socket. However, in this device the third valve is subjected to the residual pressure and its displacement therefore requires a large amount of effort.

SUMMARY

An aspect of the invention provides a coupling device, comprising a first half and a second half, the first and second halves being adapted to be connected to each other. The first half includes a body housing a front chamber and a rear chamber. The front chamber and the rear chamber are separated by a first element and a second element. The second element is slidably inserted in a bore provided in the first element. The bore forms an inner cavity in fluid communication with the front chamber. The inner cavity communicates with the rear chamber via a first through-hole provided in the first element. The inner cavity is sealed from the rear chamber. Upon connection of the coupling device, the second element is moved such that a second through-hole provided in the second element is in fluid communication with the first through-hole, thereby providing a further fluid communication between the front and rear chambers via the cavity.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
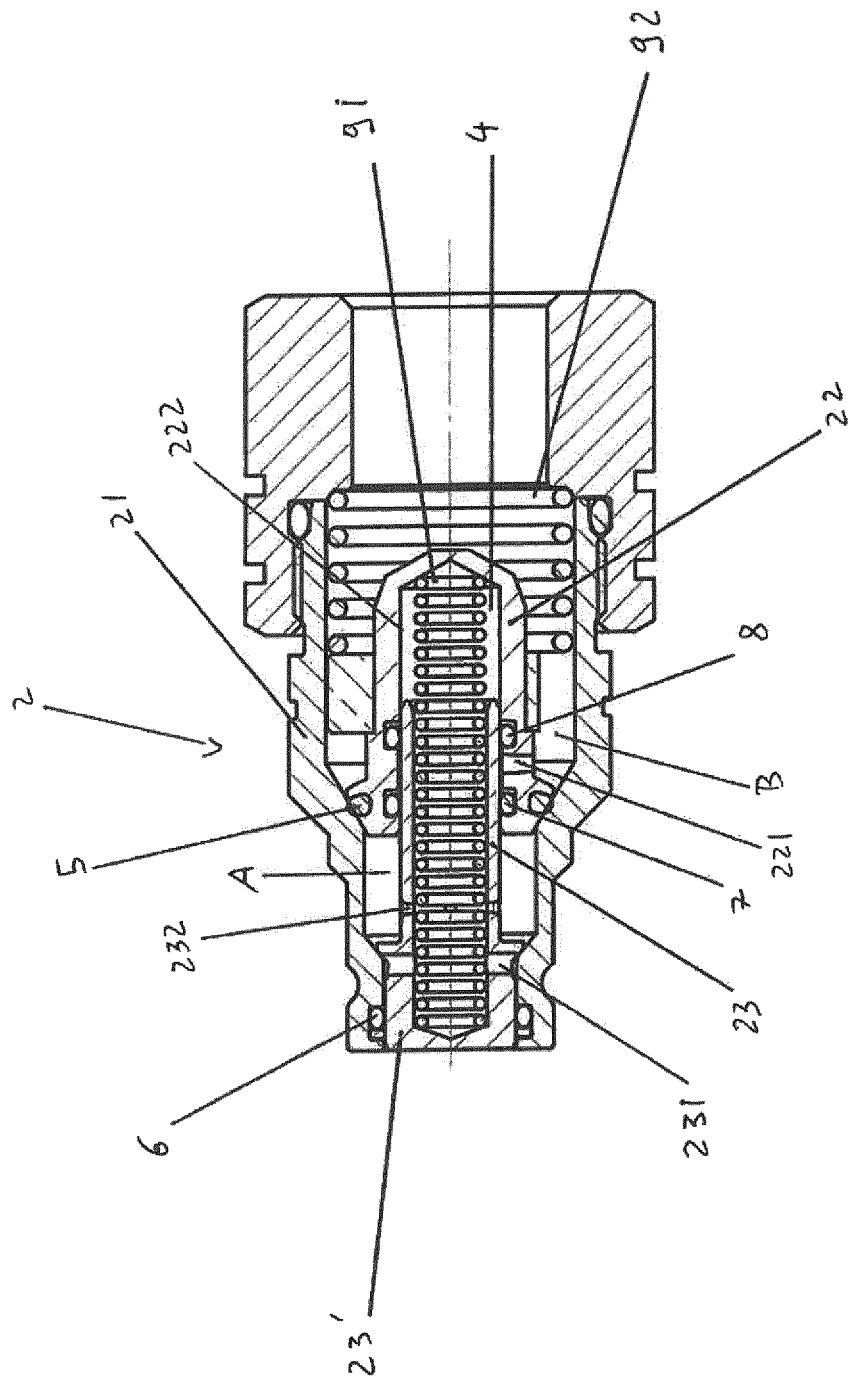
FIG. 1 represents a plug according to a preferred embodiment of the present invention.

In view of the above, an aspect of the present invention is therefore to provide a simple, preferably quick, coupling device solving the drawbacks mentioned above, and more particularly, capable of being connected without the need of a large amount of effort to evacuate the residual pressure while providing sealing properties during connection in order to prevent contamination of the fluid.

A first aspect of the invention is directed to a coupling device comprising a first half and a second half adapted to be connected to each other, wherein said first half comprises a body housing a front chamber and a rear chamber separated by a first element and a second element slidably inserted in a bore provided in said first element, wherein said bore forms an inner cavity in fluid communication with the front chamber and communicating with the rear chamber via a first through-hole provided in the first element. The coupling device is characterized in that said cavity is sealed from said rear chamber and in that upon connection of the coupling device said second element is longitudinally moved so that a second through-hole provided in said second element comes in fluid communication with said first through-hole thereby providing a fluid communication between the two chambers via said cavity. With this coupling device, connection is much easier since evacuation of the pressure is carried out without moving any element, onto which the residual pressure applies, before decompression. More particularly, the second element is not biased by the residual pressure since the first opening is sealed.

According to a preferred embodiment of the invention, the first half is a plug and the second half is a socket.

According to a further preferred embodiment of the invention, when said fluid communication is realized, a residual pressure is evacuated from the rear chamber to the front chamber. Thus, further connection is easier as the pressure biasing the second element is lower.

According to a further preferred embodiment of the invention, the residual pressure is 350 bar or less. Thus, a considerable gain of energy can be gained by avoiding applying a huge effort to open a coupling device against this pressure.

According to a further preferred embodiment of the invention, the first element is adapted to be moved only once the fluid communication between the two chambers has been realized. Thus, no huge effort is needed since the first element is moved only once the decompression has occurred.

According to a further preferred embodiment of the invention, fluid communication between the two chambers is realized before fluid communication between the two halves. Thus, decompression occurs before the connection.

According to a further preferred embodiment of the invention, the second element is biased away from the first element by a first spring. Thus, upon disconnection, the half is maintained sealed.

According to a further preferred embodiment of the invention, the front chamber is in communication with said cavity via an evacuation through-hole provided in the second element and is sealed by the body, the first element and the second element. Therefore, contamination of the device is avoided by having a sealed front chamber.

According to a further preferred embodiment of the invention, the device further comprises a fourth sealing element between the body and the first element. Thus, a reliable seal is provided between the two chambers.

According to a further preferred embodiment of the invention, the second element is a plug valve comprising a front end in contact with a third sealing element sealing the front end of the first half. Thus leakage is avoided at the front end of the half.

According to a further preferred embodiment of the invention, the first element is a cylindrical hollow valve support biased against the plug body by a second spring and a residual pressure in the rear chamber. Thus, leakage is avoided inside the half.

According to a further preferred embodiment of the invention, the sealing between the cavity and the rear chamber is realized by a first sealing element and a second sealing element. Thus, the half has a simple structure.

According to a further preferred embodiment of the invention, the first sealing element and the second sealing element are O-rings located in respective grooves on an inner surface of the bore and surrounding said first hole. Thus, replacement of the sealing element is easy and wear may be avoided.

According to a further preferred embodiment of the invention, upon connection, the evacuated residual pressure applies an opening force on a piston of the second half. Thus, upon decompression the residual pressure assists the connection of the halves.

FIG. 1 shows a plug according to a preferred embodiment of the present invention. The plug 2 comprises a plug body 21 which is to be attached to a hose or similar at its rear end, i.e. the right side of the figure, and to a socket at its front end, i.e. the left side of the figure.

As well shown, the plug 2 comprises two chambers A, B which are separated by a residual pressure relief system. This residual pressure relief system is made of a valve support 22 comprising a cylindrical bore 222 and a cylindrical plug valve 23 slidably inserted in the cylindrical bore 222 of the valve support 22.

The bore 222 forms a cavity 4 which is surrounded by the support valve 22 and by the plug valve 23 which are biased by respective springs 92 and 91 such that the plug valve 23 is able to be moved inside the bore 222. More particularly, the valve support 22 is biased by a second spring 92 against the plug body 21, preferably a retaining wall of the plug body 21, with an O-ring 5 provided between them in order to have a reliable sealing of the plug 2 between these two elements so that chambers A and B are sealed with respect to each other. On the other hand, the plug valve 23 is biased away from the valve support 22 by a first spring 91 such that upon disconnection, the front end 23' of the plug valve 23 is in contact with a sealing O-ring 6 provided at the front end of the plug body 21 in order to have a reliable sealing at the front end such that no contamination of the front chamber A may occur. This front chamber A is a 0-pressure chamber, i.e. the front chamber is not subjected to the residual pressure of the fluid contained in the hose attached to the right end of the plug. Further, as shown in the FIG. 1 the walls of front chamber A are made by the plug body 21, the plug valve 23 and the valve support 22. On the contrary, the rear chamber B is a pressurized chamber, i.e. the rear chamber comprises the fluid to be transferred and/or stored and that creates a residual pressure against the valve support 22 thereby further biasing the valve support 22 against the plug body 21.

This residual pressure is therefore sealed in the rear chamber B by the above mentioned O-ring 5 and by two further sealing elements, O-rings 7 and 8, which seal the communication between the cavity 4 and the rear chamber B provided by the through holes 221 and 232 such that in the disconnected state, the residual pressure can not be evacuated by the through-hole 221.

Figure 2A:
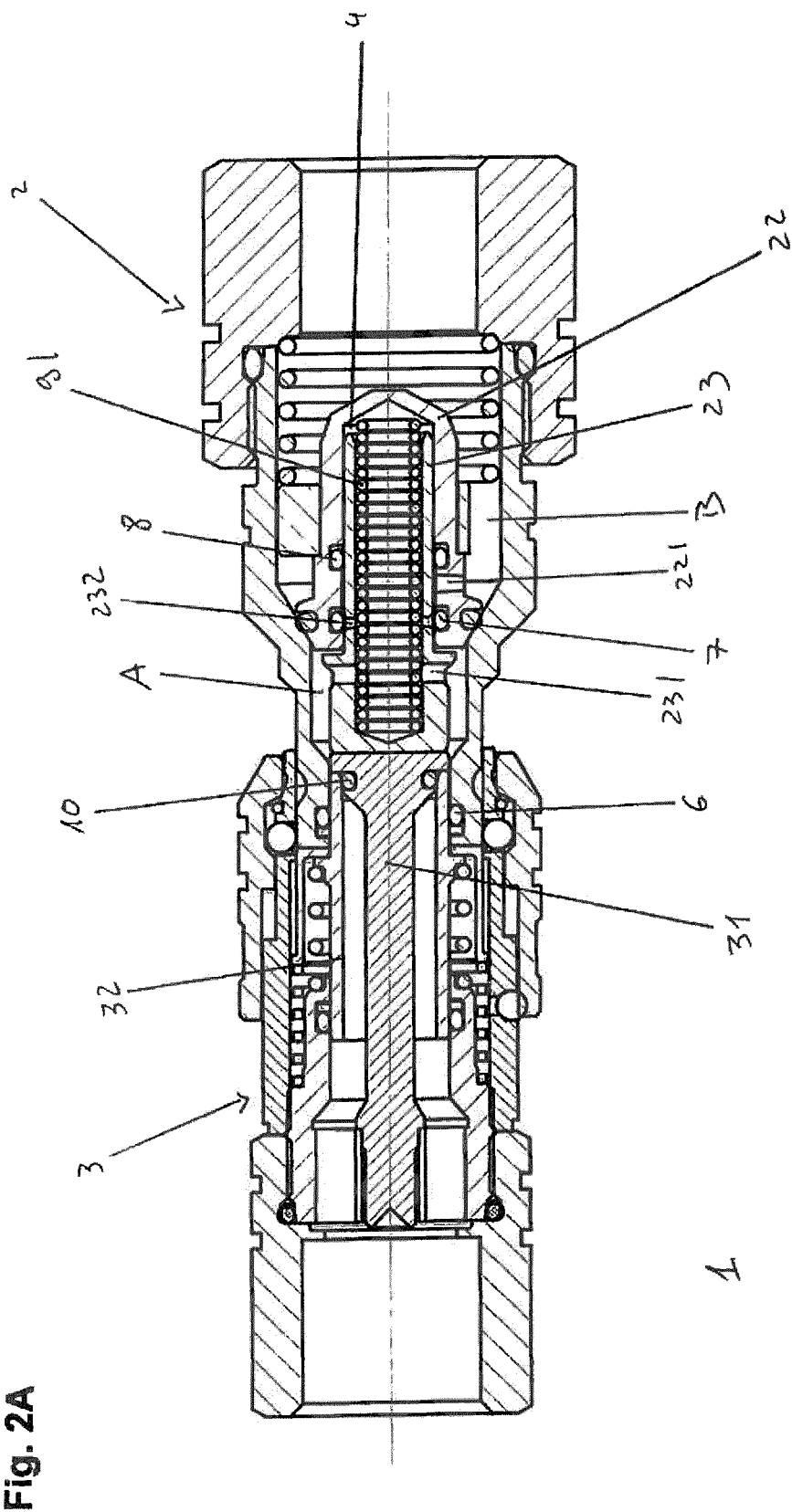
FIGS. 2A to 2C represent four steps of coupling a coupling device of the present invention.
Figure 2B:
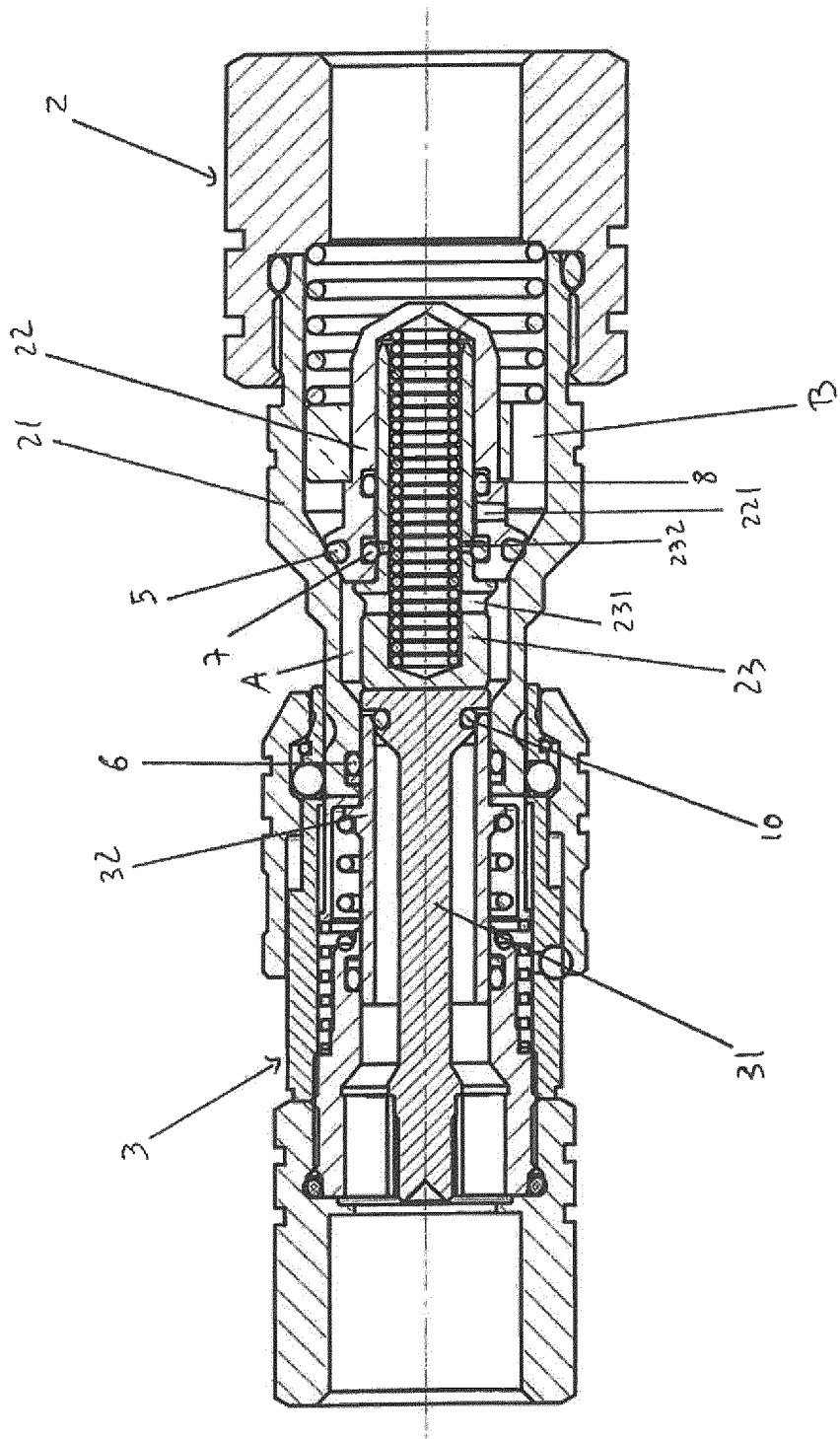
Figure 2C:
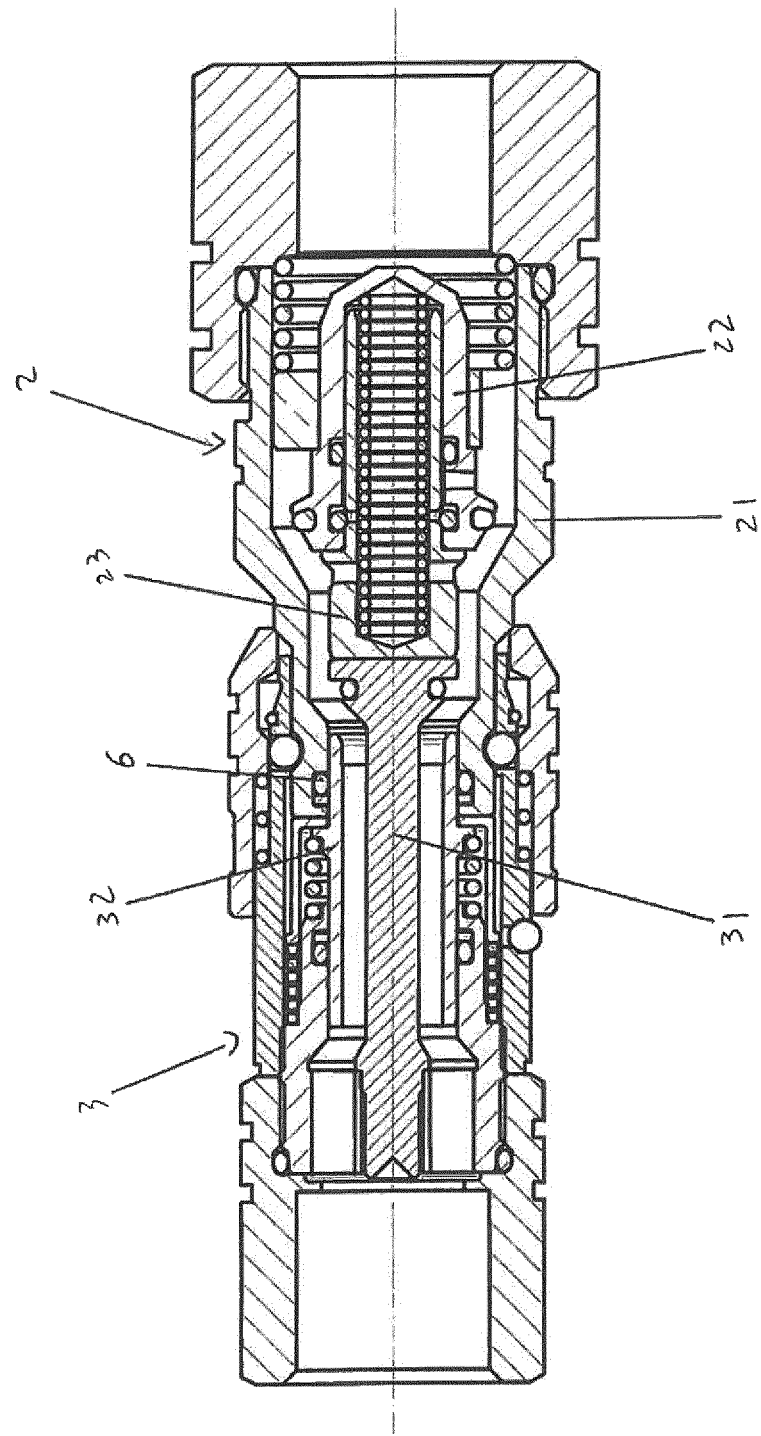

FIGS. 2A-2C represent three steps of the coupling of the plug and the socket of the coupling device of the present invention.

In FIG. 2A, representing the beginning of the connection, the plug valve 23 is moved inside the bore 222, and modify the volume of the cavity 4, rearward in the longitudinal direction by a valve 31 of the socket 3. At this moment, rear chamber B is sealed and the residual pressure is confined in that rear chamber B such that the only effort needed to move the plug valve 23, which is not subjected to the residual pressure, corresponds to the resistance of the first spring 91. The position of the valve support 22 remains unchanged such that the plug valve 21 is moved with respect to the valve support 22 while the front chamber A is still sealed by the valve support 22, via O-ring 5, by the plug valve 23 via O-rings 7 and 8, and by the piston 32 via O-ring 6. As well shown, the displacement of the plug valve 23 also moves the second through-hole 232 toward the first through-hole 221, but, at this moment, O-ring 7 is still between them, thus providing a sealing between these holes.

In FIG. 2B, representing the decompression phase, the movement initiated in FIG. 2A has been continued and the plug valve 23 has been sufficiently moved such that the second through-hole 232 has passed and is beyond the O-ring 7 such that a fluid communication path has been created between the two through-holes 221 and 232 thereby providing a fluid communication between the cavity 4 and the rear chamber B via said two holes 221, 232. Since the front chamber A is in constant communication with the cavity 4 via evacuation through-hole 231, the residual pressure can therefore be evacuated from rear chamber B to front chamber A. Therefore, rear chamber B has been depressurized without having to move the valve support 22 since an evacuation path has been created which passes first from rear chamber B to the cavity via through-holes 221 and 232 and then from the cavity 4 to the front chamber A via through-hole 231.

Further, at this moment, sealing between the plug 2, the socket 3 and the exterior is also achieved by O-rings 6 and piston 32 such that the residual pressure evacuated from rear chamber B will impinge onto the piston 32 to push it away from the valve 31 and the O-ring 10, thereby assisting in the connection of the coupling device 1.

FIG. 2C, representing complete connection of the coupling device, shows the valve support that has been displaced after evacuation of the residual pressure such that the O-ring 5 no longer touches the plug body 21 and the main fluid path which passes all around the plug valve 23 and the valve support 22 from the plug 2 to the socket 3. The coupling device 1 is kept in this complete connected state by any kind of conventional locking means such that upon unlocking this state for disconnection, the springs 91 and 92 automatically return the plug valve 23 and the valve support 22 in their original state to restore the disconnected sealed state of the plug 2.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A coupling device, comprising:
    a first half, the first and second halves being adapted to be connected to each other,
    wherein the first half includes a body housing a front chamber and a rear chamber,
    wherein the front chamber and the rear chamber are separated by a first element and a second element,
    wherein the second element is slidably inserted in a bore provided in the first element,
    wherein the bore forms an inner cavity in fluid communication with the front chamber,
    wherein the inner cavity communicates with the rear chamber via a first through-hole provided in the first element,
    wherein the inner cavity is sealed from the rear chamber,
    wherein, upon connection of the coupling device, the second element is moved such that a second through-hole provided in the second element is in fluid communication with the first through-hole, thereby providing a further fluid communication between the front and rear chambers via the cavity.

2. The device of claim 1, wherein the first half is a plug and the second half is a socket.

3. The device of claim 1, wherein, in the further fluid communication, the device is configured to evacuate a residual pressure from the rear chamber to the front chamber.

4. The device of claim 3, wherein the residual pressure is 350 bar or less.

5. The device of claim 1, wherein the first element is configured to be moved only once the further fluid communication between the front and rear chambers has been realized.

6. The device of claim 1, configured such that the further fluid communication between the front and rear chambers is realized before fluid communication between the first and second halves.

7. The device of claim 1, wherein the second element is biased away from the first element by a first spring.

8. The device of claim 1, wherein the front chamber is in communication with the inner cavity via an evacuation through-hole provided in the second element, and
    wherein the front chamber is sealed by the body, the first element, and the second element.

9. The device of claim 1, further comprising:
    a fourth sealing element between the body and the first element.

10. The device of claim 1, wherein the second element is a plug valve including a front end,
    wherein the front end is in contact with a third sealing element, and
    wherein the third sealing element seals the front end of the first half.

11. The device of claim 1, wherein the first element is a cylindrical hollow valve support biased against the plug body by a second spring and a residual pressure in the rear chamber.

12. The device of claim 1, configured such that a seal between the inner cavity and the rear chamber is realized by a first sealing element and a second sealing element.

13. The device of claim 1, wherein the first sealing element and the second sealing element are O-rings located in respective grooves on an inner surface of the bore, and
    wherein the first sealing element and the second sealing element surround the first through-hole.

14. The device of claim 3, wherein upon the connection, an evacuated residual pressure applies an opening force on a piston of the second half.

* * * * *